(12) United States Patent
Ambrazas et al.

(10) Patent No.: US 10,871,101 B2
(45) Date of Patent: Dec. 22, 2020

(54) INTERNAL-COMBUSTION ENGINE WITH DIRECT FUEL INJECTION IN THE DIRECTION OF THE INTAKE GAS MOTION

(71) Applicant: IFP Energies nouvelles, Rueil-Malmaison (FR)

(72) Inventors: Didier Ambrazas, Fresnes (FR); Xavier Gautrot, Rueil-Malmaison (FR); Olivier Laget, Rueil-Malmaison (FR); Julien Trost, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/144,071

(22) Filed: Sep. 27, 2018

(65) Prior Publication Data

US 2019/0101048 A1 Apr. 4, 2019

(30) Foreign Application Priority Data

Sep. 29, 2017 (FR) ..................................... 17/59.056

(51) Int. Cl.
*F02B 23/10* (2006.01)
*F02M 61/14* (2006.01)
(Continued)

(52) U.S. Cl.
CPC ............ *F02B 23/101* (2013.01); *F02B 23/08* (2013.01); *F02B 23/10* (2013.01); *F02B 31/02* (2013.01);
(Continued)

(58) Field of Classification Search
CPC ........ F02B 23/08; F02B 23/10; F02B 23/101; F02B 23/104; F02B 31/02;
(Continued)

(56) References Cited

U.S. PATENT DOCUMENTS 4,421,081 A * 12/1983 Nakamura .............. F02B 23/08
123/310
4,844,025 A * 7/1989 Sheaffer ................ F02B 23/101
123/310
(Continued)

FOREIGN PATENT DOCUMENTS

| DE | 3019330 A1 | 11/1981 |
|----|-----------|---------|
| EP | 0945604 A1 | 9/1999 |
| FR | 2926849 A1 | 7/2009 |

OTHER PUBLICATIONS

French Search Report in connection with French App. No. 855168 dated Oct. 9, 2018.
European Search Report in connection with European App. No. 18196435.4 dated Nov. 30, 2018.

*Primary Examiner* — John Kwon
*Assistant Examiner* — Johnny H Hoang
(74) *Attorney, Agent, or Firm* — Fitch, Even, Tabin & Flannery, L.L.P.

(57) ABSTRACT

The present invention relates to an internal-combustion engine comprising a combustion chamber provided with a single intake valve (2), a single exhaust valve (3), two plugs (4a, 4b) and a fuel injector (5). Furthermore, the combustion chamber comprises means for forming an aerodynamic swirling motion structure of the intake gas in the combustion chamber. Besides, fuel injector (5) is oriented so as to inject the fuel into the central area of the combustion chamber in the direction of the aerodynamic swirling motion structure.

17 Claims, 5 Drawing Sheets

(51) Int. Cl.
*F02F 1/18* (2006.01)
*F02P 15/08* (2006.01)
*F02P 15/02* (2006.01)
*F02P 13/00* (2006.01)
*F02B 31/02* (2006.01)
*F02B 23/08* (2006.01)

(52) U.S. Cl.
CPC ............. *F02F 1/183* (2013.01); *F02M 61/14* (2013.01); *F02P 13/00* (2013.01); *F02P 15/02* (2013.01); *F02P 15/08* (2013.01); *F02B 2023/085* (2013.01); *F02B 2023/102* (2013.01); *F02B 2023/106* (2013.01); *F02B 2023/108* (2013.01); *F02B 2275/32* (2013.01)

(58) Field of Classification Search
CPC .......... F02B 2023/085; F02B 2023/102; F02B 2023/106; F02B 2023/108; F02B 2075/125; F02B 2075/1812; F02P 15/02; F02P 15/08; F02P 13/00; F02M 61/14; F02F 1/18; F02F 1/183; F02F 1/243
See application file for complete search history.

(56) References Cited

U.S. PATENT DOCUMENTS

| | | | | |
|---|---|---|---|---|
| 6,035,824 | A * | 3/2000 | Lee | F02B 17/005 123/295 |
| 6,267,107 | B1 * | 7/2001 | Ward | F02B 17/00 123/162 |
| 6,499,457 | B2 * | 12/2002 | Suzuki | F02B 23/101 123/295 |
| 6,748,917 | B1 * | 6/2004 | Hoffmann | F02B 17/005 123/295 |
| 6,935,302 | B2 * | 8/2005 | Kashiwagura | F02D 37/02 123/295 |
| 7,506,631 | B2 * | 3/2009 | Altenschmidt | F02B 17/005 123/298 |
| 9,267,421 | B2 * | 2/2016 | Toda | F02B 11/00 |
| 2002/0195079 | A1 * | 12/2002 | Kubo | F02B 17/005 123/295 |
| 2005/0241612 | A1 * | 11/2005 | Ward | F02B 23/08 123/301 |
| 2010/0175673 | A1 * | 7/2010 | Ward | F01L 1/022 123/661 |

* cited by examiner

INTERNAL-COMBUSTION ENGINE WITH DIRECT FUEL INJECTION IN THE DIRECTION OF THE INTAKE GAS MOTION

FIELD OF THE INVENTION

Cross Reference to Related Applications

Reference is made to French Patent Application No. 17/59.056 filed Sep. 29, 2017, to which priority is claimed and which is incorporated herein by reference in its entirety.

The present invention relates to the field of direct fuel injection internal-combustion engines.

This type of engine generally comprises at least a cylinder, a piston sliding in this cylinder in a reciprocating rectilinear motion, intake means for an oxidizer, burnt gas exhaust means, a combustion chamber and injection means for injecting a fuel directly into the combustion chamber.

Upon design of an engine, the performance, pollutant emission and combustion chamber mechanical strength constraints are increasingly high whereas the means for meeting these constraints may be incompatible.

Thus, performance increase generally leads to an increase in emissions and to higher mechanical stresses.

To overcome these stresses and in order to guarantee low pollutant emissions and satisfactory mechanical strength over the entire engine operating range, using all of the fuel present in the combustion chamber, for example by an oxidizer comprising air at ambient pressure, supercharged air or a mixture of air (supercharged or not) and of recirculated burnt gas, is of great importance. Indeed, the fuel mixture (oxidizer/fuel) in the combustion chamber needs to be as homogeneous as possible.

Furthermore, in order to ensure good efficiency and combustion rate, it is desirable to have a high turbulence level, and more specifically a high turbulent kinetic energy level upon ignition of the fuel mixture.

There are different techniques for implementing such turbulences, known as swirl (longitudinal motion), tumble (transverse motion), swumble (swirl and tumble) and squish (sudden motion).

Swirl, which is a macroscopic rotating motion of the fuel mixture about an axis collinear to the cylinder axis, is characterized by good motion conservation during the intake process, and more specifically during the rise of the piston. It is an aerodynamic macroscopic motion that is generally used for compression-ignition internal-combustion engines for which it is a good way to homogenize the fuel mixture.

Tumble is also a macroscopic rotating motion of the fuel mixture, but about an axis substantially perpendicular to the cylinder axis. It has the specific feature of turning into microscopic aerodynamic motions that create turbulence as the piston rises. It is an aerodynamic macroscopic motion that is generally used for spark-ignition internal-combustion engines for which it is a good way to obtain an acceptable combustion rate. Besides, this motion is quite sensitive to the combustion chamber geometry and to the lift law, in terms of spread as well as maximum lift height.

Swumble is a motion consisting of swirl and tumble. Using swumble allows to benefit from the advantages of the two aerodynamic structures detailed above and thus from excellent homogenization and a better combustion rate, thanks to a higher turbulence level during the intake phase than the levels observed with the best current spark-ignition engines.

Squish is a sudden aerodynamic motion that appears when air is rapidly "expelled" from a dead volume.

BACKGROUND OF THE INVENTION

Various combustion chamber designs have been achieved for implementing these phenomena.

For example, patent US-2005/241,612 describes a direct-injection high-squish combustion chamber whose ignition occurs through at least one plug. However, the layout of the valves, the injector and the plugs is not optimized to promote swumble, in order to improve the engine performances (efficiency and combustion rate).

According to another example, patent PH-2010/000,186 describes a combustion chamber generating squish through a specific shape close to an ellipse. However, for this combustion chamber, fuel injection is not direct, which does not promote swumble and engine performances (efficiency and combustion rate).

Furthermore, within the context of these combustion chambers with a turbulent aerodynamic structure of the intake gas (i.e. with swirl and/or tumble and/or squish), the fuel injector is so arranged as to generate a jet countercurrent to the intake aerodynamic motion in order to promote homogenization, which generates a break in the aerodynamic structure.

To overcome these drawbacks, the present invention provides an internal-combustion engine comprising a combustion chamber provided with a single intake valve, a single exhaust valve, two plugs and a fuel injector. Furthermore, the combustion chamber comprises means for forming a turbulent aerodynamic motion structure of the intake gas in the combustion chamber. Besides, the fuel injector is oriented so as to inject the fuel into the central area of the combustion chamber in the direction of the turbulent aerodynamic motion structure. Thus, this cocurrent fuel injection allows to avoid breaking the aerodynamic structure of the intake gas while maintaining good fuel mixture homogeneity thanks to the turbulence level.

SUMMARY OF THE INVENTION

The invention relates to an internal-combustion engine comprising at least one cylinder in which a piston moves, said cylinder being associated with a combustion chamber provided with a single intake valve, a single exhaust valve, a fuel injector and two plugs. Said combustion chamber comprises means for forming an aerodynamic motion structure of the intake gas with turbulences within said combustion chamber, and said fuel injector is oriented so as to inject the fuel into the central area of said combustion chamber between said two plugs, in the direction of said aerodynamic motion structure of the intake gas.

According to an embodiment of the invention, said fuel injector is arranged between said intake valve and a plug.

According to an implementation of the invention, said fuel injector has a machined part of cylindrical shape.

Advantageously, said fuel injector is inclined with respect to the direction of the cylinder axis at an angle below 15°, preferably ranging between 6° and 10°, and more preferably substantially equal to 8°.

According to an aspect, said fuel injector is arranged in the combustion chamber, close to the periphery of said combustion chamber.

According to a characteristic, said plugs are positioned between said intake valve and said exhaust valve.

According to an embodiment, said fuel injector is positioned at a distance ranging between 5 and 15 mm, more specifically between 9 and 10 mm, from said intake valve and at a distance ranging between 20 and 40 mm, more specifically between 25 and 30 mm, from the exhaust valve.

Advantageously, said plugs are spaced apart by a distance ranging between 30% and 50% of the diameter of said cylinder, preferably between 35% and 45% of the diameter of said cylinder.

According to an implementation, said plugs and said intake and exhaust valves are positioned in such a way that the centres thereof form the vertices of a square.

Preferably, said square has an edge of length ranging between 24 and 31 mm.

According to an embodiment, the plug closest to said fuel injector is inclined with respect to the direction of the cylinder axis at an angle ranging between 25° and 30°, preferably between 28° and 29°.

According to an aspect, the plug furthest from said fuel injector is inclined with respect to the direction of the axis of said cylinder at an angle ranging between 25° and 35°, more specifically between 28° and 32°, and preferably substantially 30°.

According to a characteristic, the combustion chamber has a substantially elliptical shape, said intake and exhaust valves being arranged at the ends of the major axis of the ellipse, and said plugs being arranged close to the minor axis of the ellipse.

According to an implementation, said means for forming said intake aerodynamic motion structure involve the shape of said combustion chamber and/or the shape of the intake pipe.

Furthermore, the invention relates to the use of an internal-combustion engine according to one of the above characteristics with a Miller cycle.

BRIEF DESCRIPTION OF THE FIGURES

Other features and advantages of the system according to the invention will be clear from reading the description hereafter, given by way of non limitative example, with reference to the accompanying figures wherein.

DETAILED DESCRIPTION OF THE INVENTION

The present invention relates to an internal-combustion engine. The internal-combustion engine comprises:
at least one cylinder in which a piston moves,
a combustion chamber associated with the cylinder, the combustion chamber comprising:
  a single intake valve, allowing delivery of the gas mixture to the combustion chamber before the combustion phase,
  a single exhaust valve, allowing discharge of the burnt gas after the combustion phase,
  a single fuel injector, allowing direct injection of the fuel into the combustion chamber,
  two plugs (also referred to as ignition devices), allowing ignition of the gas/fuel mixture in the combustion chamber, and
  means for forming an aerodynamic motion structure of the intake gas with turbulences in the combustion chamber (in other words, means allowing swumble and/or squish to be formed in the combustion chamber).

The gas mixture can comprise supercharged air or not, or a mixture of air, supercharged or not, with recirculated burnt gas.

The fuel can notably be gasoline or diesel fuel.

According to the invention, the fuel injector is so oriented as to inject the fuel in the direction of the intake gas aerodynamic motion structure, while preventing wetting of the walls. In this case, the fuel injector is oriented towards the centre of the combustion chamber so as to promote fuel injection between the two ignition devices. Thus, this cocurrent fuel injection allows to prevent breaking the aerodynamic structure of the intake gas while maintaining good fuel mixture homogeneity thanks to the turbulence level.

Using only two valves (one for the intake and the other for the exhaust) involves several design advantages. Indeed, such an engine is less expensive (with a limited number of parts), lighter and more compact. Furthermore, this design provides more space for the plugs and the injector.

Using a single intake valve facilitates the creation of swumble. Indeed, it is more difficult to create swumble with two dispensing intake pipes.

According to an aspect of the invention, the fuel injector can have a machined part of cylindrical shape so as to prevent fuel splash on the walls. In other words, in-place machining of the fuel injector is performed up to the combustion chamber (protruding into the combustion chamber) so as to ensure that the injector is not partly obstructed by the combustion chamber.

In order to enable proper fuel orientation, the fuel injector can be inclined with respect to the direction of the cylinder axis (generally the vertical axis). The angle of inclination of the fuel injector with respect to this direction can be below 15°, it preferably ranges between 6° and 10° and it is more preferably substantially equal to 8°.

According to an implementation of the invention, the fuel injector can be positioned at a distance ranging between 5 and 15 mm from the intake valve, preferably between 9 and 10 mm from the intake valve, and at a distance ranging between 20 and 40 mm, more specifically between 25 and 30 mm from the exhaust valve. The main advantage of this configuration is to have the fuel injector closer to the intake than to the exhaust, which allows better management of the temperature and possibly cooling thereof.

According to a characteristic, the plugs can be spaced apart by a distance ranging between 30% and 50% of the diameter of the cylinder, preferably between 35% and 45% of the diameter of the cylinder. This spacing is optimal for a dual flame front development that minimizes the combustion duration, while avoiding unburnt gas zones and zones where engine knock is likely to appear.

According to a configuration of the invention, the two plugs and the two valves (intake and exhaust) can be positioned in such a way that the centres thereof form the vertices of a square. Advantageously, the square formed can have an edge of length ranging between 24 and 31 mm.

Preferably, the plugs can be inclined with respect to the direction of the axis of the cylinder (generally the vertical direction), and more preferably at two different angles. This allows to compensate for the constraints related to the combustion engine architecture. Indeed, it was not possible to position the plugs vertically in the chamber at their optimum location. Inclining them allows to recentre the ignition point without entirely moving the plug.

According to an example embodiment, the plug closest to the fuel injector can be inclined with respect to the direction of the cylinder axis at an angle ranging between 25° and 30°, preferably between 28° and 29°.

According to an example embodiment, the plug furthest from the fuel injector can be inclined with respect to the direction of the cylinder axis at an angle ranging between 25° and 35°, more specifically between 28° and 32°, and preferably at an angle of substantially 30°.

The means for forming the intake aerodynamic structure with turbulences (swumble and/or squish) can notably comprise the shape of the combustion chamber and/or the shape of the intake pipe.

According to an embodiment of the invention, the combustion chamber can have substantially the shape of an ellipse. This shape promotes considerable squish. Indeed, the ratio of the surface area of this ellipse to the surface area of a section of the cylinder is particularly small, which corresponds to a great squish.

In order to promote swumble and squish, the components of the combustion chamber can be arranged in a specific manner:
   the intake valve and the exhaust valve are arranged at the ends of the major axis of the ellipse, thus the valves are located at opposite ends and spaced apart,
   the plugs are arranged close to the minor axis of the ellipse, thus the plugs are located between the intake valve and the exhaust valve, and
   the fuel injector is arranged inside the ellipse, close to the periphery thereof, between the intake valve and a plug, this location promoting mixing of the gas and the fuel thanks to the swumble motion.

This elliptical design of the combustion chamber associated with this arrangement of the components allows to generate an aerodynamic swumble structure and to promote homogenization of the fuel mixture. Furthermore, it enables a high combustion rate while preventing autoignition phenomena. Indeed, it is reminded that swumble allows to benefit from excellent homogenization and a better combustion rate thanks to a higher turbulence level during the intake phase than those observed with the best current spark-ignition engines.

According to an embodiment of the invention, the ellipse can comprise a recess extending towards the intake valve. The recess is arranged substantially symmetrically to the fuel injector with respect to the major axis. In other words, the recess is on the side of the intake valve opposite the side on which the fuel injector is positioned. The recess thus is located between a plug and the intake valve. A recess is understood to be a modification in the outer shape of the ellipse, this modification being achieved towards the inside of the ellipse. The recess enables swirl type turbulences to be intensified. Indeed, the purpose of the recess is to promote the formation of the swirl part of the swumble motion. This recess creates an extension of the pipe in the chamber, which provides continuation of the aerodynamic structure formation.

According to an embodiment of the invention, the intake valve can be tangential to the ellipse. Thus, filling of the combustion chamber is optimized.

According to a characteristic of the invention, the exhaust valve can be tangential to the ellipse. Thus, emptying of the combustion chamber is optimized.

According to a configuration of the invention, the plugs are not positioned on the periphery of the ellipse. This arrangement of the plugs provides optimal propagation of the flame front in order to prevent engine knock and unburnt gas.

According to an embodiment of the invention, the combustion engine can comprise an air intake pipe connected to the combustion chamber, in which the intake valve configured to initiate a swumble motion, i.e. a rotating motion of the air about the cylinder axis (tumble) and a rotating motion about an axis perpendicular to the cylinder axis (swirl), is positioned.

Figure 1:
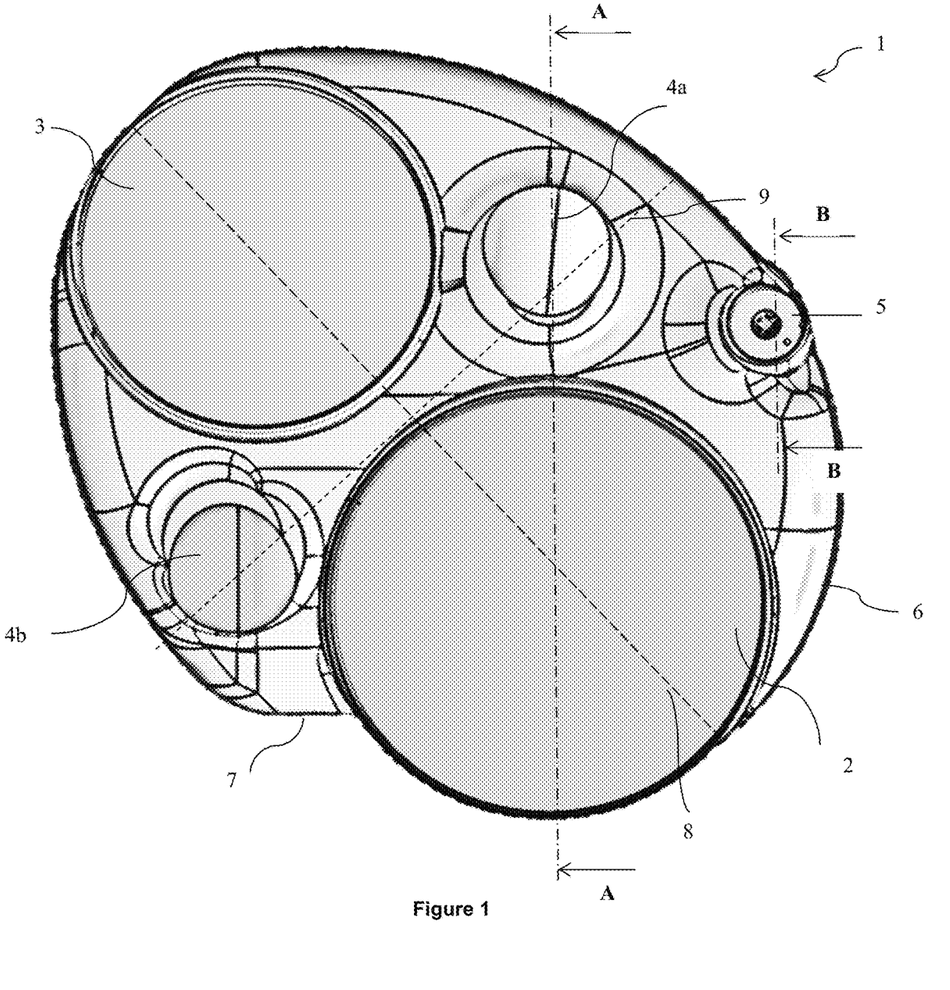
FIG. 1 illustrates a combustion chamber according to an embodiment of the invention.

FIG. 1 schematically illustrates, by way of non limitative example, a combustion chamber 1 according to an embodiment of the invention. Combustion chamber 1 substantially has the shape of an ellipse 6. Ellipse 6 is defined by the major axis 8 and the minor axis 9 thereof. Combustion chamber 1 comprises a single intake valve 2 located at one end of a semi-major axis 8. Intake valve 2 is tangential to ellipse 6. Combustion chamber 1 comprises a single exhaust valve 3 located at one end of a semi-major axis 8. This end lies opposite the end on which intake valve 2 is positioned. Exhaust valve 3 is tangential to ellipse 6. Combustion chamber 1 further comprises two plugs 4a and 4b. Plugs 4a and 4b are substantially arranged on minor axis 9 (close to minor axis 9). Furthermore, combustion chamber 1 comprises a single fuel injector 5. Fuel injector 5 is positioned inside ellipse 6, on the periphery thereof. Besides, fuel injector 5 is located between intake valve 2 and a plug 4a. On the side opposite to injector 5, ellipse 6 comprises a rectilinear recess 7. Rectilinear recess 7 is positioned between a plug 4b and intake valve 2. Rectilinear recess 7 extends towards intake valve 2.

In addition to promoting squish, elliptical shape 6 as presented also promotes the development of the swirl motion that starts in the intake pipe. This combustion chamber is somehow the extension thereof.

Figure 2:
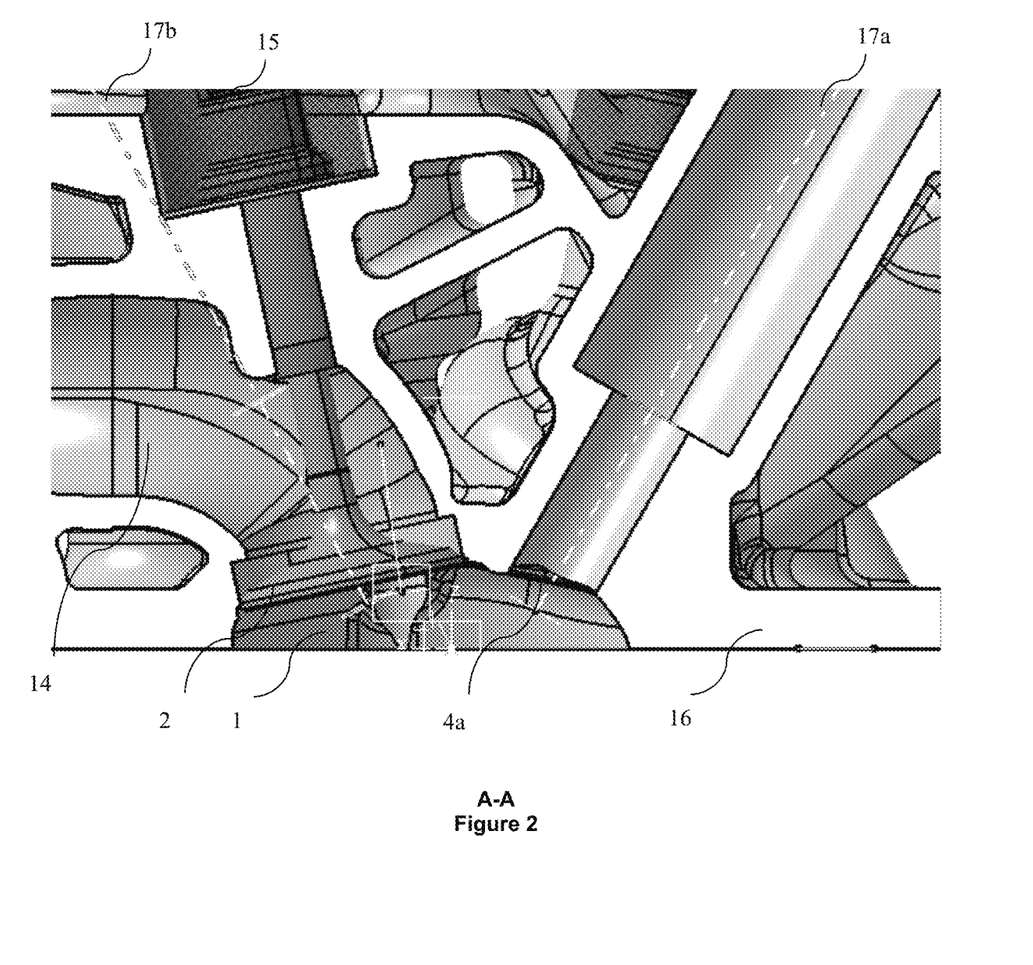
FIG. 2 is a cross-sectional view of a combustion engine according to an embodiment of the invention.

FIG. 2 schematically illustrates, by way of non limitative example, a partial cross-sectional view of a combustion engine according to an embodiment of the invention. It is a cross-section along axis AA of FIG. 1. FIG. 2 illustrates within the engine crankcase 16 (in white in the figure) notably a combustion chamber 1, an intake valve 2, located between an intake pipe 14 and the combustion chamber, and a plug 4a. This figure also shows actuator 15 of intake valve 2. Furthermore, axes 17a and 17b of plugs 4a and 4b respectively are also illustrated in this figure. Axis 17a corresponds to plug 4a and axis 17b corresponds to plug 4b (not shown in cutting plane AA). Both plugs 4a and 4b are inclined to the vertical (i.e. in the direction of the cylinder), the angles of inclination of axes 17a and 17b are different.

Figure 3:
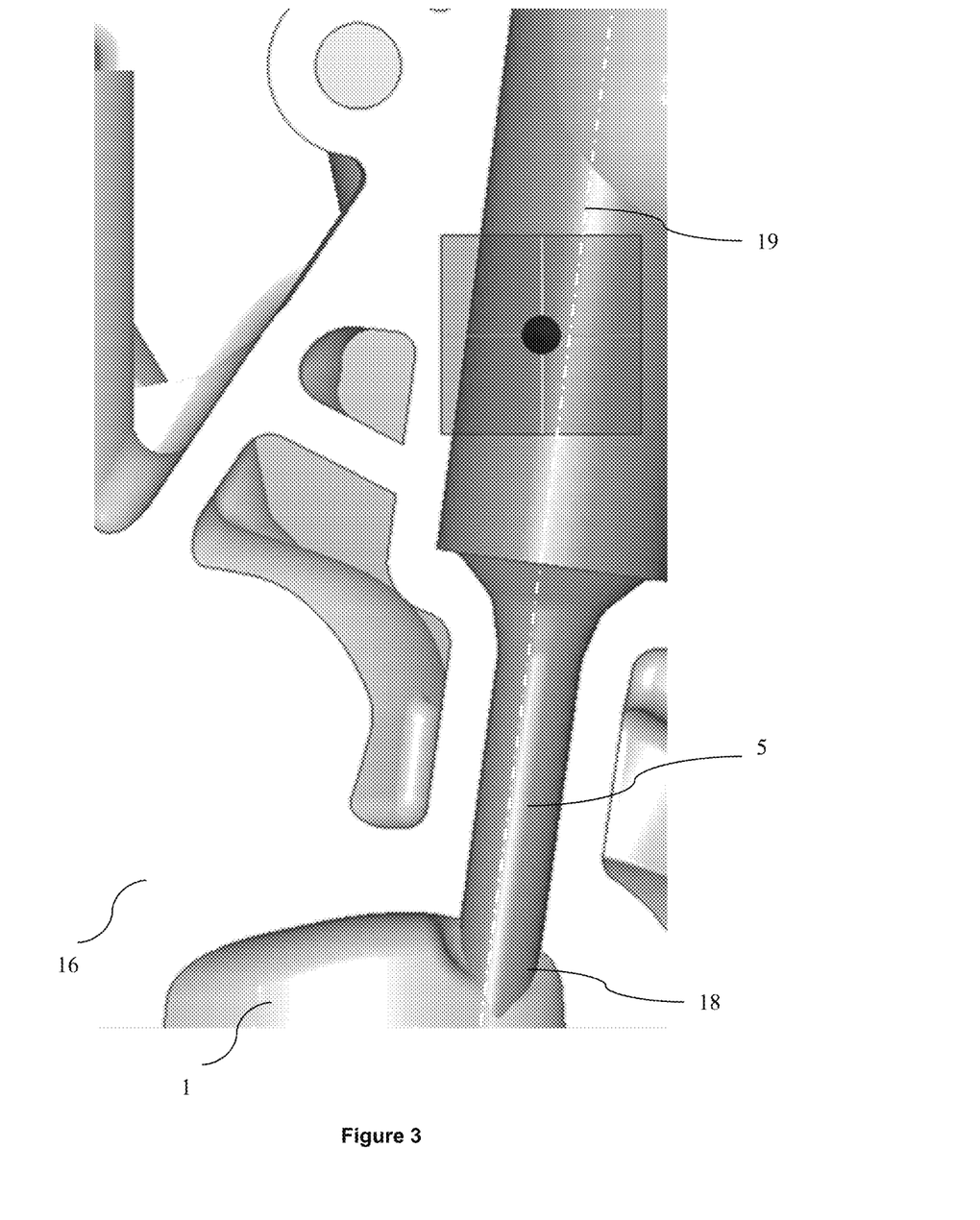
FIG. 3 is a cross-sectional view of a combustion engine according to an embodiment of the invention.

FIG. 3 schematically illustrates, by way of non limitative example, a partial cross-sectional view of a combustion engine according to an embodiment of the invention. It is a cross-section along axis BB of FIG. 1. FIG. 3 illustrates within engine crankcase 16 (in white in the figure) notably a combustion chamber 1 and a fuel injector 5. Fuel injector 5 comprises a machined part of substantially cylindrical shape 18 protruding into combustion chamber 1 so as to ensure that the injector is not partly obstructed by the combustion chamber. Furthermore, this figure also shows axis 19 of fuel injector 5. The fuel injector is inclined to the vertical (i.e. the direction of the cylinder), the angle of inclination of axis 19 being smaller than angles 17a and 17b of plugs 4a and 4b of FIG. 2.

According to an aspect of the invention, the internal-combustion engine comprises at least one cylinder. For example, the combustion engine can comprise two, three or four cylinders.

According to a characteristic of the invention, the combustion engine can comprise a burnt gas recirculation circuit (EGR).

The invention relates to a combustion engine specifically designed to obtain good fuel mixture homogeneity and thus to provide better combustion efficiency.

In particular, the combustion engine according to the invention is particularly suited for use with a so-called Miller cycle over a wide operating range. This cycle is characterized by an intake valve closure before the bottom dead center of the piston. This allows to have increased work recovery, in addition to cooling of the charge admitted.

Such a combustion engine can be used in the field of transport, road or air transport for example, or in the field of stationary installations such as a generator set.

Application Example

The features and advantages of the combustion engine according to the invention will be clear from reading the application example below.

Figure 4:
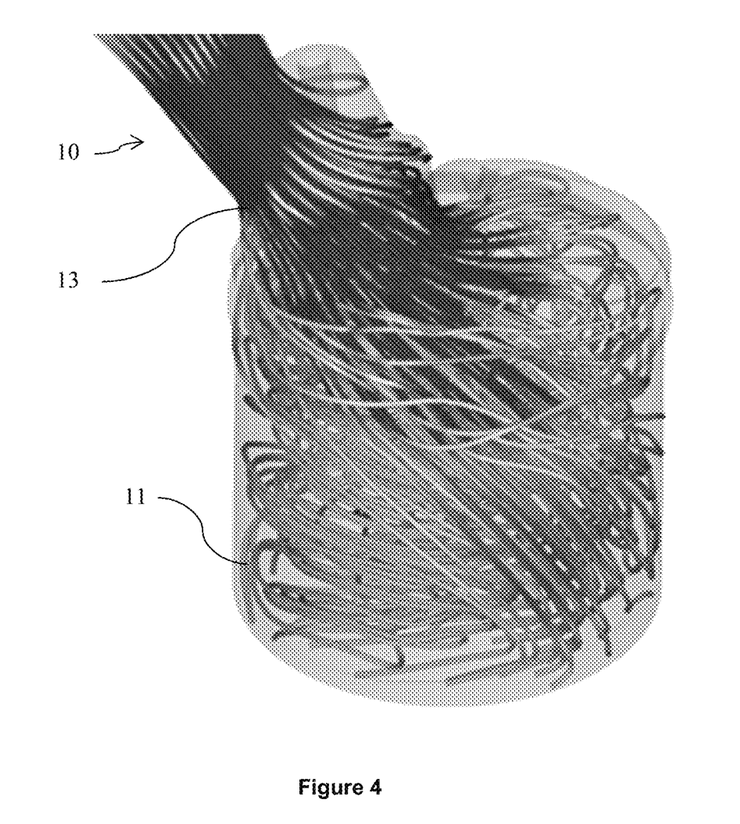
FIG. 4 illustrates the structure of the swumble formed in a cylinder by means of the combustion chamber according to an embodiment of the invention.

FIG. 4 schematically shows, by way of non limitative example, a graphic representation of the aerodynamic swumble structure within intake pipe 10 and cylinder 11, for an engine provided with a combustion chamber according to the invention. FIG. 4 illustrates various gas streams 13 in these elements.

It is also observed that the combustion duration is independent of the distribution law spread and calibration, which is not found in current spark-ignition engines. This enables the overall efficiency of the internal-combustion engine to be positively impacted.

Thus, the combustion chamber according to the invention enables a high swumble in the cylinder, which optimizes the efficiency of the combustion and therefore of the combustion engine.

Figure 5:
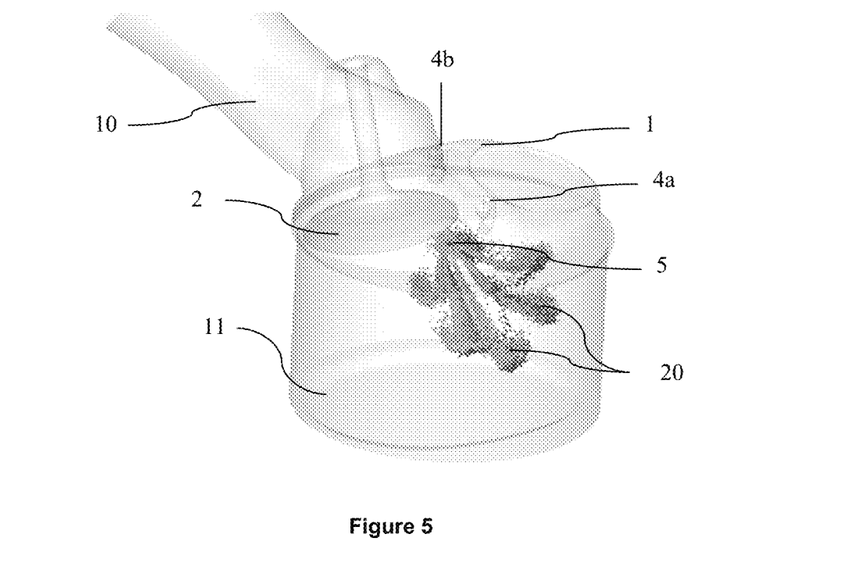
FIG. 5 illustrates the injection of fuel into the combustion chamber according to an embodiment of the invention.

FIG. 5 schematically shows, by way of non limitative example, a visual representation of the fuel injection in combustion chamber 1 and cylinder 11, for a combustion engine according to the invention. Combustion chamber 1 is in accordance with the embodiment of FIG. 1: it has a substantially elliptical shape and it comprises an intake valve 2, two plugs 4a and 4b, and a fuel injector 5. Fuel injector 5 is so oriented as to inject the fuel in the direction of the aerodynamic motion structure of the intake gas while preventing wetting of the walls. In the present case, fuel injector 5 is oriented towards the centre of combustion chamber 1 so as to favour fuel injection between the two plugs 4a and 4b. FIG. 5 illustrates in dark grey several fuel sprays 20 coming from fuel injector 5. These sprays are directed towards the central area between the two plugs 4a and 4b.

Figure 6:
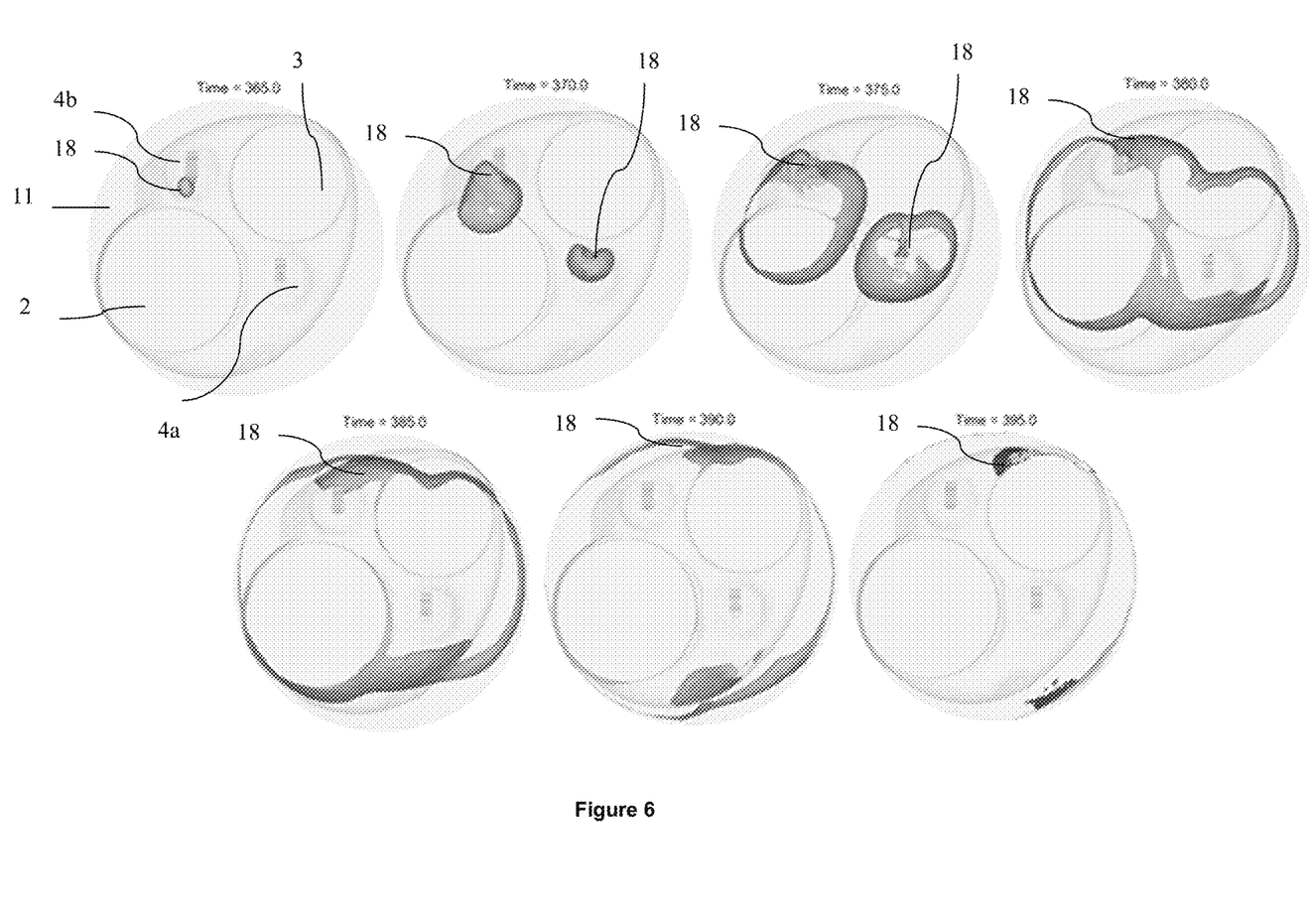
FIG. 6 illustrates the evolution of the flame front within the context of a combustion in the combustion chamber according to an embodiment of the invention.

FIG. 6 shows the evolution of the front flame during combustion for an engine comprising a combustion chamber as illustrated in FIGS. 1 and 2, FIG. 6 being a top view of cylinder 11 and of the combustion chamber. The combustion engine comprises an elliptical combustion chamber with a single intake valve 2, a single exhaust valve 3, two spark plugs 4a and 4b, and an injector (not shown). Each thumbnail image of FIG. 6 corresponds to a different time (Time) (time is defined by the crank angle, with 360° as the reference corresponding to the top dead centre of the piston during the engine combustion phase). The darker areas 18 correspond to the flame front. These thumbnails clearly show the advantage provided by the dual ignition point optimized according to the invention. Indeed, it can be noted that the flame front is circular and that it leaves no "dead zone" where unburnt gas might persist.

The invention claimed is:

1. An internal-combustion engine comprising at least one cylinder in which a piston moves, the at least one cylinder being associated with a combustion chamber provided with a single intake valve, a single exhaust valve, a fuel injector and two plugs, wherein the combustion chamber comprises a structure for forming an aerodynamic motion structure of an intake gas with turbulences within the combustion chamber, the fuel injector is oriented so as to inject fuel into a central area of the combustion chamber between the two plugs, in a direction of the aerodynamic motion structure of the intake gas, the structure for forming an aerodynamic motion structure of the intake gas comprises a substantially elliptical shape of the combustion chamber, the intake and exhaust valves are arranged at the ends of a major axis of the substantially elliptical shape, the plugs are arranged close to a minor axis of the substantially elliptical shape, and the fuel injector is inclined with respect to a direction of an axis of the at least one cylinder at an angle ranging between 6° and 10°.

2. The internal-combustion engine as claimed in claim 1, wherein the fuel injector is arranged between the intake valve and a plug of the two plugs.

3. The internal-combustion engine as claimed in claim 1, wherein the fuel injector has a machined part of cylindrical shape.

4. The internal-combustion engine as claimed in claim 1, wherein the fuel injector is arranged within the combustion chamber, close to a periphery of the combustion chamber.

5. The internal-combustion engine as claimed in claim 1, wherein the plugs are positioned between the intake valve and the exhaust valve.

6. The internal-combustion engine as claimed in claim 1, wherein the fuel injector is positioned at a distance ranging between 5 and 15 mm from the intake valve and at a distance ranging between 20 and 40 mm from the exhaust valve.

7. The internal-combustion engine as claimed in claim 1, wherein the plugs are spaced apart by a distance ranging between 30% and 50% of a diameter of the at least one cylinder.

8. The internal-combustion engine as claimed in claim 1, wherein the plugs and the intake and exhaust valves are positioned in such a way that the centers thereof form vertices of a square.

9. The internal-combustion engine as claimed in claim 8, wherein the square has an edge of length ranging between 24 and 31 mm.

10. The internal-combustion engine as claimed in claim 1, wherein a plug of the two plugs closest to the fuel injector is inclined with respect to the direction of an axis of the at least one cylinder at an angle ranging between 25° and 30°.

11. The internal-combustion engine as claimed in claim 1, wherein a plug of the two plugs furthest from the fuel injector is inclined with respect to the direction of an axis of the at least one cylinder at an angle ranging between 25° and 35°.

12. The internal-combustion engine as claimed in claim 1, wherein the structure for forming the aerodynamic motion structure of the intake gas further comprises a shape of the intake pipe.

13. A method of operating the internal-combustion engine as claimed in claim 1, the method comprising operating the internal-combustion engine with a Miller cycle.

14. A method of operating the internal-combustion engine as claimed in claim 1, the method comprising operating the internal-combustion engine in a Miller cycle in which the intake valve closes before bottom dead center of the piston.

15. The internal-combustion engine as claimed in claim 1, wherein the fuel injector is inclined with respect to the direction of the axis of the at least one cylinder at an angle substantially equal to 8°.

16. The internal-combustion engine as claimed in claim 1, wherein the plugs are spaced apart by a distance ranging between 35% and 45% of the diameter of the at least one cylinder.

17. The internal-combustion engine as claimed in claim 1, wherein a plug of the two plugs closest to the fuel injector is inclined with respect to a direction of an axis of the at least one cylinder at an angle ranging between 28° and 29°.

\* \* \* \* \*